(12) United States Patent
Tabata et al.

(10) Patent No.: US 11,155,016 B2
(45) Date of Patent: Oct. 26, 2021

(54) LIQUID BLOW MOLDING APPARATUS AND LIQUID BLOW MOLDING METHOD

(71) Applicants: DISCMA AG, Hunenberg (CH); Shinichi Tabata, Kanagawa (JP); Mitsuru Shiokawa, Kanagawa (JP)

(72) Inventors: Shinichi Tabata, Kanagawa (JP); Mitsuru Shiokawa, Kanagawa (JP)

(73) Assignee: Discma AG, Zürich (CH)

(*) Notice: Subject to any disclaimer, the term of this patent is extended or adjusted under 35 U.S.C. 154(b) by 145 days.

(21) Appl. No.: 15/570,208

(22) PCT Filed: Apr. 18, 2016

(86) PCT No.: PCT/JP2016/002074
§ 371 (c)(1),
(2) Date: Oct. 27, 2017

(87) PCT Pub. No.: WO2016/174846
PCT Pub. Date: Nov. 3, 2016

(65) Prior Publication Data
US 2018/0117826 A1    May 3, 2018

(30) Foreign Application Priority Data
Apr. 30, 2015 (JP) .............................. JP2015-093651

(51) Int. Cl.
*B29C 49/46* (2006.01)
*B29C 49/42* (2006.01)
(Continued)

(52) U.S. Cl.
CPC ............ *B29C 49/46* (2013.01); *B29C 49/421* (2013.01); *B29C 49/783* (2013.01); *B29C 49/06* (2013.01);
(Continued)

(58) Field of Classification Search
None
See application file for complete search history.

(56) References Cited

U.S. PATENT DOCUMENTS

2005/0206045 A1    9/2005  Desanaux et al.
2012/0315350 A1   12/2012  Andison et al.
(Continued)

FOREIGN PATENT DOCUMENTS

| JP | 10-076568 A | 3/1998 |
| JP | 2013154617 A | 8/2013 |
| JP | 2014008636 A | 1/2014 |

*Primary Examiner* — Peter L Vajda
*Assistant Examiner* — Adrianna N Konves
(74) *Attorney, Agent, or Firm* — Eric J. Sosenko; Jonathan P. O'Brien; Honigman LLP

(57) ABSTRACT

A liquid blow molding apparatus for liquid blow molding a resin preform into a container having a prescribed shape. The apparatus includes a blow molding mold in which the preform is disposed; a blow nozzle that engages in an opening of the preform; a pressurized liquid supply that supplies a pressurized liquid to a supply path that is connected to the blow nozzle; and a seal member that is provided inside the supply path and opens and closes the supply path with respect to the blow nozzle. The pressurized liquid supply is configured to start supplying the pressurized liquid to the supply path after the seal member has begun to open.

13 Claims, 2 Drawing Sheets

(51) Int. Cl.
*B29C 49/78* (2006.01)
*B29C 49/12* (2006.01)
*B29C 49/58* (2006.01)
*B29C 49/06* (2006.01)
*B29L 31/00* (2006.01)

(52) U.S. Cl.
CPC ...... *B29C 49/12* (2013.01); *B29C 2049/4664* (2013.01); *B29C 2049/5803* (2013.01); *B29L 2031/7158* (2013.01)

(56) References Cited

U.S. PATENT DOCUMENTS

| | | | |
|---|---|---|---|
| 2014/0356475 A1* | 12/2014 | Sato | B29C 49/06 |
| | | | 425/524 |
| 2015/0021833 A1 | 1/2015 | Chauvin et al. | |
| 2015/0076105 A1 | 3/2015 | Sato et al. | |
| 2015/0246475 A1* | 9/2015 | Suyama | B29C 49/58 |
| | | | 264/526 |
| 2017/0008216 A1* | 1/2017 | Suyama | B29C 49/783 |

* cited by examiner

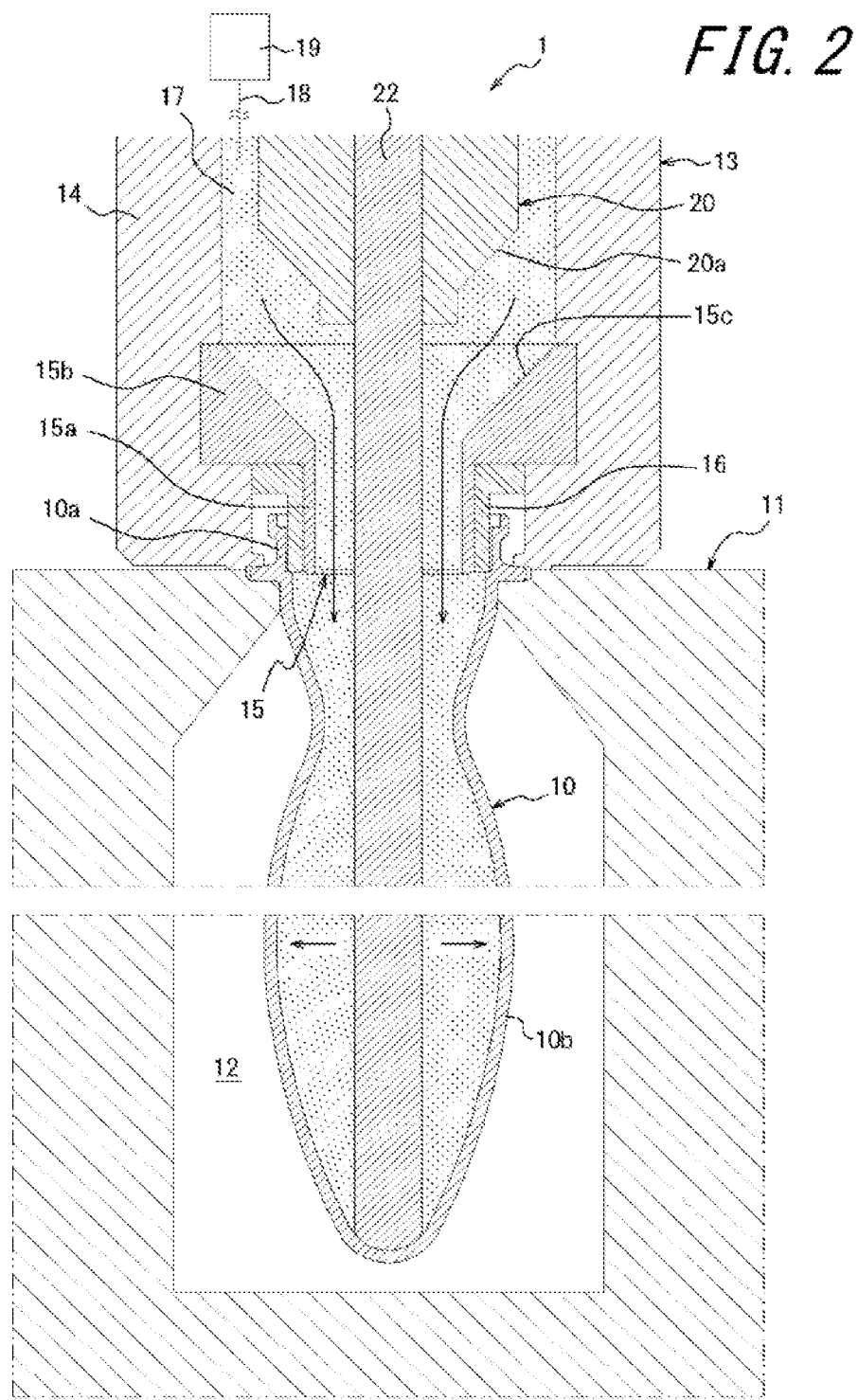

LIQUID BLOW MOLDING APPARATUS AND LIQUID BLOW MOLDING METHOD

BACKGROUND

Field of Technology

This invention concerns a liquid blow molding apparatus which supplies a pressurized liquid to a resin preform and which liquid-blow-molds the preform into a container having a prescribed shape, and to a liquid blow molding method.

Related Technology

Resin containers, typified by polypropylene (PP) bottles and polyethylene terephthalate (PET) bottles, are used in applications in which they contain various liquids, such as beverages, cosmetics, medicines, cleaning agents, and shampoos. Such containers are generally produced by blow-molding preforms that are formed from resin materials into closed bottomed cylindrical forms.

Liquid blow molding apparatuses which use pressurized liquids as liquids which are supplied to preforms are known as blow molding apparatuses which blow-mold preforms. In Unexamined Japanese Patent Application No. 2013-154617, for example, a liquid blow molding apparatus is described that has a blow molding mold in which a preform is disposed, a blow nozzle that is fitted to the opening of the preform which is disposed in the blow mold, a pressurized liquid supply section that supplies a pressurized liquid to a supply path which is connected to the blow nozzle, and a seal member that opens and closes the supply path to the blow nozzle. By feeding the pressurized liquid to the supply path from the pressurized liquid supply section and opening the seal member, the pressurized liquid is supplied to the inner part of the preform and this preform is liquid-blow-molded into a container of a specified shape. By means of such a liquid blow molding apparatus, the step of filling the container with the content fluid after it is molded is omitted by using the content fluid, such as a beverage, which is finally contained in the container as the product, and this production process and the constitution of the liquid blow molding apparatus can be simplified.

SUMMARY OF THE INVENTION

A known kind of liquid blow molding apparatus is a device that performs liquid blow molding by starting the supply of the pressurized liquid to the supply path from the pressurized liquid supply section at the same time as the operation of opening the seal member is started.

In this kind of constitution, the seal member is not opened when the supply of the pressurized liquid to the supply path from the pressurized liquid supply section is started, and, therefore, the pressure of the liquid in the supply path is raised in the initial stage when the seal member begins to open. Moreover, when the seal member is opened in this state, the liquid with its pressure raised is supplied to the preform all at once; as a result, the behavior of the liquid in the preform in the first period of the supply of the liquid to the preform is disturbed, and there has been a concern that the molding ability is lowered by producing misalignment in the container after it is molded, unevenness of the wall thickness, etc.

This principles of the present invention were devised with this kind of problem in mind; its purpose is to provide a liquid blow molding apparatus and liquid blow molding method which raise the molding ability of the preform by stabilizing the behavior of the liquid in the initial period of the supply of the liquid to the preform.

The liquid blow molding apparatus of this invention is a liquid blow molding apparatus which liquid-blow-molds a resin preform into a container of a specific shape; it has a blow molding mold in which the aforementioned preform is disposed, a blow nozzle which is fitted to the opening of the aforementioned preform, a pressurized liquid supply section that supplies a pressurized liquid to a supply path which is connected to the aforementioned blow nozzle, and a seal member which is placed on the aforementioned supply path and opens and closes the aforementioned supply path to the aforementioned blow nozzle. It is characterized by the fact that the aforementioned pressurized liquid supply section starts the supply of the pressurized liquid to the aforementioned supply path after the opening of the aforementioned seal member has started.

In a liquid blow molding apparatus incorporating the principles of this invention, with the aforementioned constitution, it is desirable for the time, from the start of the opening of the aforementioned seal member until the aforementioned pressurized liquid supply section starts the supply of the pressurized liquid to the aforementioned supply path, be no shorter than 0.01 second and no longer than 0.05 second.

In the liquid blow molding apparatus according to the principles of this invention, with the aforementioned constitution, it is desirable for the time, from the start of the opening of the aforementioned seal member until the aforementioned pressurized liquid supply section starts the supply of the pressurized liquid to the aforementioned supply path, be no shorter than 0.01 second and no longer than 0.03 second.

In the liquid blow molding apparatus incorporating the principles of this invention, with the aforementioned constitution, it is desirable for the apparatus to be provided with an extension rod for extending the aforementioned preform in the longitudinal direction.

The liquid blow molding method incorporating the principles of this invention is characterized by the fact that it is a liquid blow molding method which liquid-blow-molds a resin preform into a container of a specific form; it uses a liquid blow molding apparatus which has a blow molding mold in which a preform is disposed, a blow nozzle that is fitted to the opening of the preform which is disposed in the blow mold, a pressurized liquid supply section that supplies a pressurized liquid to a supply path which is connected to the blow nozzle, and a seal member that opens and closes the supply path to the blow nozzle, and the aforementioned pressurized liquid supply section starts the supply of the pressurized liquid to the aforementioned supply path after the opening of the aforementioned seal member has started.

In the liquid blow molding method according to the principles of this invention, in the aforementioned constitution, it is desirable for the time from the start of the opening of the aforementioned seal member until the aforementioned pressurized liquid supply section starts the supply of the pressurized liquid to the aforementioned supply path to be made no shorter than 0.01 second and no longer than 0.05 second.

In the liquid blow molding method according to the principles of this invention, in the aforementioned constitution, it is desirable for the time from the start of the opening of the aforementioned seal member until the aforementioned pressurized liquid supply section starts the supply of the pressurized liquid to the aforementioned supply path to be made no shorter than 0.01 second and no longer than 0.03 second.

By means of the principles of this invention, the pressurized liquid supply section starts the supply of the pressurized liquid to the supply path after the opening of the seal member has started; because of this, the pressure of the liquid in the supply path is prevented from being increased above a specific value by the pressurized liquid supply section before the seal member opens. Therefore, the behavior of this liquid is stabilized in the initial period of the supply of the liquid into the preform and the molding ability of the preform can be increased.

Thus, by means of the principles of this invention, a liquid blow molding apparatus and liquid blow molding method which increase the molding ability of the preform by stabilizing the behavior of the liquid in the initial period of the supply of the liquid to the preform can be provided.

BRIEF DESCRIPTION OF THE DRAWINGS

FIG. 2: An explanatory drawing which shows the state of the liquid blow molding apparatus shown in FIG. 1 while the preform is being liquid-blow-molded.

DETAILED DESCRIPTION

Figure 1:
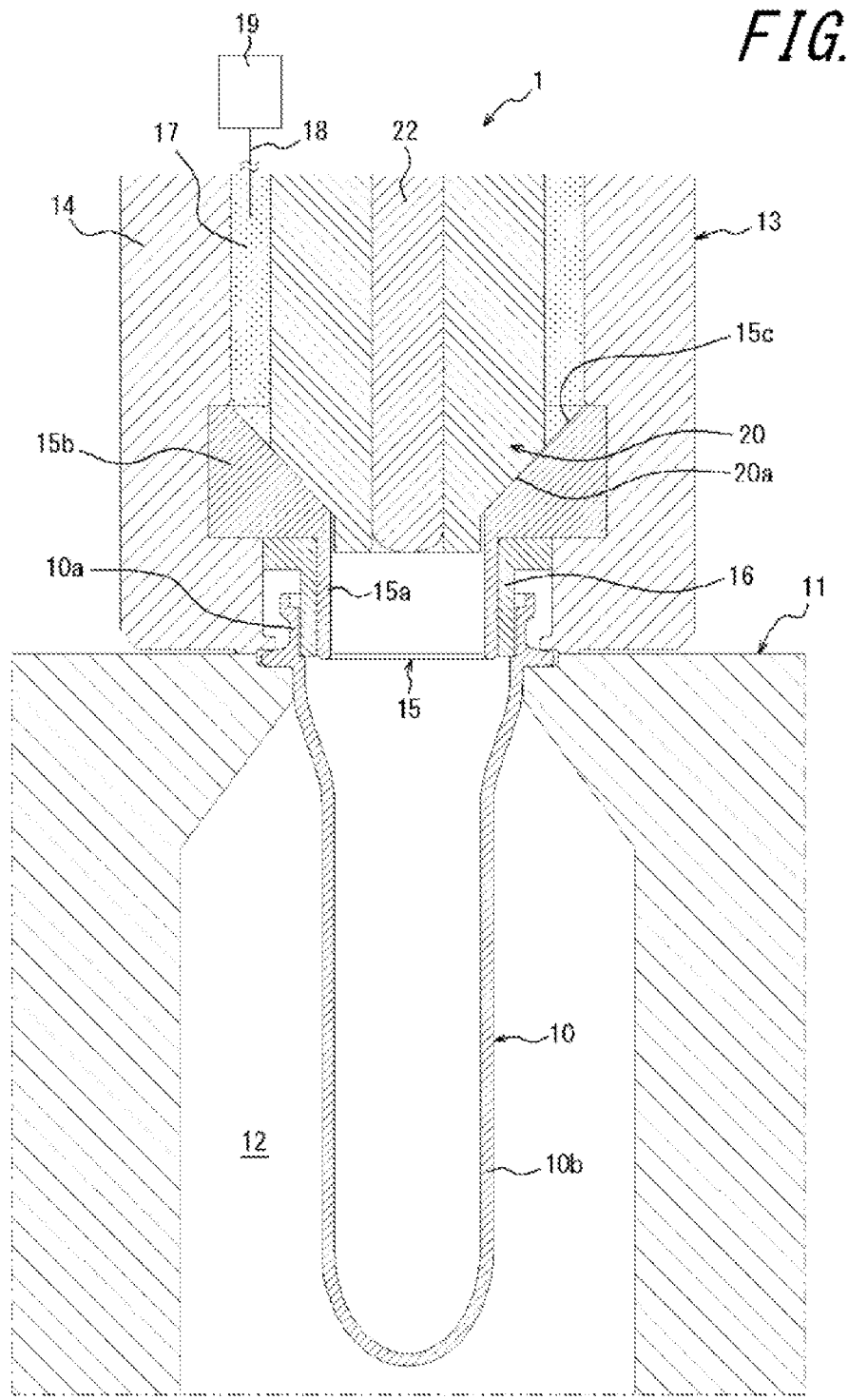
FIG. 1: An explanatory drawing which shows the constitution of a liquid blow molding apparatus which is a working embodiment of this invention.

This invention will be explained concretely below with reference to the drawings.

The liquid blow molding apparatus 1 of this invention, shown in FIG. 1, liquid-blow-molds a resin preform 10 into a container with a specific shape by a liquid blow molding method to produce this container, which is a working embodiment of this invention. Furthermore, liquid blow molding is a type of blow molding that uses a pressurized liquid, in place of pressurized air, as the pressurized fluid that is supplied to the preform 10.

The liquid blow molding apparatus 1 has, for example, a blow molding mold 11 which is constituted by a mold for blow molding. Only a part of the blow molding mold 11 is shown in FIG. 1, but the cavity 12 of this blow molding mold 11 has a bottle shape, and the cavity opens upward at the upper surface of the blow molding mold 11. The details are not shown, but the blow molding mold 11 is made so that it can open to the left and right, and the molded product can be removed from the blow molding mold 11 by opening the blow molding mold 11.

A preform 10 is disposed in the blow molding mold 11; it is molded into a container by being liquid blow-molded by this liquid blow molding apparatus 1.

As the preform 10, one can use one which is molded into a bottomed cylinder (roughly test-tube-shaped) provided with an opening 10a and a main body 10b by molding a resin material in which drawability is produced by heating, such as polypropylene (PP) or polyethylene terephthalate (PET), by a means such as injection molding, compression molding, extrusion molding, etc. This kind of preform 10 is heated beforehand to a specific temperature that produces drawability and is disposed in the blow molding mold 11 in an upright position in which, in this state, the opening 10a projects above the cavity 12.

Furthermore, the preform 10 is not limited to a single-layer structure which is molded from only one kind of resin material; it may also be a laminated structure in which a plurality of kinds of resin materials are laminated. In this case, the plurality of resin layers may be formed by being bonded to each other, but they may also be made into a laminated structure in which the outer and inner layers are molded from different materials and laminated in such a way that they do not bond together, or a laminated structure in which an adhesive layer is put between the inner and outer layers in this laminated structure in a banded form in the axial direction. When the preform 10 is given a laminated structure in which the layers are not bonded together in this manner, the preform 10 can be molded into a delaminated container of a specific shape by the liquid blow molding apparatus 1. Furthermore, the preform 10 with a laminated structure is not limited to the ones mentioned above; it may have any kind of layered composition.

A nozzle unit 13 is placed on the upper surface of the blow molding mold 11, in such a way that it is free to move in the vertical direction with respect to the blow molding mold 11. The nozzle unit 13 has a main block body 14 and a blow nozzle 15.

The blow nozzle 15 has a composition in which the main nozzle body 15a, which is formed in a tubular shape with a smaller diameter than the inner diameter of the opening 10a of the preform 10, and a large-diameter clamping part 15b, which is formed integrally with this main nozzle body 15a, are formed integrally from a steel, resin, etc., material, and the clamping part 15b is fixed to the main block body 14 by being fitted into the inner surface of the main block body 14.

The main nozzle body 15a is disposed coaxially with the cavity 12 of the blow molding mold 11, and the nozzle unit 13 engages with the opening 10a of the preform 10, which has been mounted to the blow molding mold 11, when it comes down to a specific position. Furthermore, t reference numeral 16 indicates a seal which seals the gap between the main nozzle body 15a and the opening 10a.

A supply channel 17, which extends in the vertical direction and is disposed coaxially with the main nozzle body 15a, is located inside the main block body 14; this supply channel 17 is connected to the blow nozzle 15 at its lower end.

A pressurized liquid supply 19 is connected to the supply channel 17 through a tube 18. The pressurized liquid supply 19 can supply a liquid, which has been pressurized to a specific pressure, to the supply channel 17 through the tube 18. When the pressurized liquid is supplied to the supply channel 17 from the pressurized liquid supply 19, the preform 10 comes to be liquid-blow-molded into a container having a shape that conforms to the cavity 12 of the blow molding mold 11.

For the pressurized liquid supply 19, it is desirable to use one that is constituted by using a plunger pump, for example, as the source of the pressure, but ones with other constitutions can also be used, as long as they can supply liquids which have been pressurized to specific pressures to the interior of the preform 10.

A seal member 20 is disposed inside the supply channel 17 in order to open and close the supply channel 17 with respect to the blow nozzle 15, that is, open and close the flow path between the supply channel 17 and the blow nozzle 15. The seal member 20 is formed in a cylindrical shape, extending along the axis of the supply channel 17 and is free to move inside the supply channel 17 in the vertical direction in relation to the main block body 14. In relationship to this, a tapered obstructing surface 15c is located on the upper surface of the clamping part 15b of the blow nozzle 15. When the seal member 20 moves to the lower stroke end, the tapered surface 20a located on the lower end of the seal member 20 touches the obstructing surface 15c, whereupon the communication between the supply channel 17 and the main nozzle body 15a is blocked and the supply channel 17 is put into a state in which it is obstructed and closed with respect to the blow nozzle 15, that is a closed state. On the other hand, when the seal member 20 moves upward, the tapered surface 20a located on the lower end of the seal member 20 is separated from the obstructing surface 15c, whereupon the supply channel 17 and the main nozzle body 15a communicate and the supply channel 17 is put into a state in which it is opened with respect to the blow nozzle 15, that is, in an open state.

Consequently, as shown in FIG. 2, because the main nozzle body 15a is fitted to the opening 10a of the preform 10 and with the pressurized liquid supply 19 actuated in a state in which the seal member 20 is opened and the supply channel 17 communicates with the blow nozzle 15, the pressurized liquid is supplied into the preform 10 from the pressurized liquid supply 19 through the supply channel 17 and the blow nozzle 15 and the preform 10 can be liquid-blow-molded.

The liquid blow molding apparatus 1 can also be constituted by installing an extension rod 22 in an insertion hole which is formed in the center of the seal member 20 so that it is free to slide. In this case, the extension rod 22 is free to move with respect to the seal member 20 in the vertical direction (the axial direction). As shown in FIG. 2, by moving downward (toward the bottom of the cavity 12) with respect to the seal member 20, the extension rod 22 pushes the bottom part of the main body part 10b of the preform 10, which was disposed in the blow molding mold 11, downward, and this main body part 10b is extended in the axial direction (vertical direction) within the cavity 12. That is, if an extension rod 22 is installed, the liquid blow molding apparatus 1 is constituted in such a way that biaxially-extended blow molding is performed, in which the preform 10 disposed in the blow molding mold 11 is extended in the diameter, radial direction by the pressurized liquid while it is extended in the vertical, axial direction, using the extension rod 22.

Furthermore, the pressurized liquid supply section 19, the seal member 20, and the extension rod 22 are made so that they are controlled as a whole in their operation and operational timing, etc., by a control device, which is not shown in the drawings.

As was discussed above, in the state of the liquid blow molding apparatus 1 in which the main nozzle body 15a is engaged with the opening 10a of the preform 10, the seal member 20 is opened and the supply channel 17 communicates with the blow nozzle 15, and the pressurized liquid is supplied to the supply channel 17 from the pressurized liquid supply 19. Thus, the pressurized liquid is supplied to the preform 10 through the blow nozzle 15 and the liquid blow molding is performed. Furthermore, at this time, after the opening of the seal member 20 has started (the opening operation of the seal member 20 has started), the supply of the pressurized liquid to the supply channel 17 by the pressurized liquid supply 19 is started. That is, in the liquid blow molding apparatus 1 of this invention, the supply of the pressurized liquid to the supply channel 17 from the pressurized liquid supply section 19 does not start at the same time that the opening of the seal member 20 starts; the supply of the pressurized liquid to the supply channel 17 from the pressurized liquid supply 19 starts after the seal member 20 has started to open. In this way, the liquid in the supply channel 17 being pressurized above a specific value by the pressurized liquid supply section 19 before the seal member 20 opens is prevented. When the seal member 20 has opened to the extent that the liquid can flow sufficiently, the liquid is supplied to the preform 10 with the desired pressure, the behavior of the liquid in the initial period of supply to the preform 10 is stabilized, and the molding ability of the preform 10 can be raised.

Furthermore, it is desirable for the seal member 20 to be constituted so that its opening is started at the same time as the opening operation is started, but it may also be constituted in such a way that the opening is started after a certain time has passed after the opening operation is started. In this case, for the pressurized liquid supply 19, the time the seal member 20 started the opening operation is not made the basis; the supply of the pressurized liquid to the supply channel 17 is started with the time when the seal member 20 has actually started to open the supply channel 17 to the blow nozzle 15 is made the basis.

As was discussed above, in order to stabilize the behavior of the liquid in the initial period of supply to the preform 10 and raise the molding ability of the preform 10, it is desirable to make the time between the start of the opening of the seal member 20 and the start of the supply of the pressurized liquid to the supply channel 17 by the pressurized liquid supply 19 no less than 0.01 second and no more than 0.05 second. If this time is less than 0.01 second, the amount of opening of the seal member 20 when the supply of the pressurized liquid to the supply channel 17 by the pressurized liquid supply 19 has started is still small, the liquid in the supply channel 17 will be pressurized a little above the specific value, and the molding ability of the preform will be slightly reduced. On the other hand, if this time is longer than 0.05 second, the quantity of the liquid that is not pressurized, but which flows into the preform 10 before the preform 10 is liquid-blow-molded by the pressurized liquid, becomes great and the preform 10, which is in a state of being heated, is cooled by this liquid, lowering its molding ability. Therefore, as discussed above, it is desirable for the time between the start of the opening of the seal member 20 and the start of the supply of the pressurized liquid to the supply channel 17 by the pressurized liquid supply 19 to be no less than 0.01 second and no more than 0.05 second.

Moreover, in order to raise the molding ability of the preform 10 further, it is desirable to make the time between the start of the opening of the seal member 20 and the start of the supply of the pressurized liquid to the supply channel 17 by the pressurized liquid supply section 19 no less than 0.01 second and no more than 0.03 second. If this time is longer than 0.03 second, the lowering of the molding ability (including the forming ability) due to the rise in the pressure in the supply channel 17 can be avoided, but the quantity of the liquid, which is not pressurized and which flows into the preform before the preform 10 is liquid-blow-molded by the pressurized liquid, becomes great, and the preform 10, which is in a state of being heated, is cooled by this liquid, lowering its molding ability. In addition, the shrinkage of the container after it is molded becomes greater, and its filling capacity is reduced. This will also be connected with a misalignment of the container due to excess cooling. If this time is shorter than 0.03 second, the quantity of the liquid, which is not pressurized and which flows into the preform 10 before the preform 10 is liquid-blow-molded by the pressurized liquid, can be made so small that the effect of the cooling with respect to the preform 10 becomes essentially zero. Therefore, the cooling of the preform 10 from its heated state by the liquid and the lowering of its molding ability can be prevented, and its molding ability can be increased.

Furthermore, the problem that the preform 10 is cooled and its molding ability is lowered by the supply of unpressurized liquid to the preform 10 is aggravated when a liquid with a lower temperature than the heating temperature of the preform 10 (residual heat temperature) is used. For example, this can occur if the temperature of the liquid supplied to the preform is at an ordinary temperature (for example, 20° C.), or a lower temperature (10° C. or lower), but this problem can be solved by raising the temperature of the liquid to an extent that cooling of the preform 10 is not caused.

Next, in order to confirm the effectiveness of this invention, a test was performed in which the time after the opening operation of the seal member was started until the supply of the pressurized liquid to the supply channel by the pressurized liquid supply was started was varied and liquid blow molding was performed, in order to evaluate the molding ability of the preform in the case in which a bottle-shaped container which is used for a capacity of 360 ml was molded by liquid-blow-molding a resin preform by supplying water at an ordinary temperature (20° C.), pressurized to a specific pressure, to the preform. The results of the evaluation are shown in Table 1.

TABLE 1

| | | | | | | |
|---|---|---|---|---|---|---|
| Operation timing of the pressurized liquid supply | 0 | 0.01 | 0.02 | 0.03 | 0.05 | 0.06 |
| Degree of opening of the seal member | 0 | 9 | 52 | 100 | 100 | 100 |
| Rise of pressure in the supply channel in the initial supply period | Yes | No | No | No | No | No |
| Misalignment | Yes | No | No | No | No | Yes |
| Filling capacity (ml) 1 | 390.38 | 390.83 | 391.48 | 390.91 | 389.86 | — |
| 2 | 388.92 | 391.51 | 390.87 | 390.78 | 388.63 | — |
| 3 | 390.80 | 392.78 | 390.76 | 388.92 | 390.56 | — |
| Average | 390.03 | 391.71 | 391.04 | 390.20 | 389.68 | — |

In Table 1, the "Operation timing of the pressurized liquid supply" row shows the time (in seconds) after the opening operation of the seal member is started until the supply of the pressurized liquid to the supply channel by the pressurized liquid supply is started. Furthermore, "0" in this row shows the case in which the supply of the pressurized liquid to the supply channel by the pressurized liquid supply was started at the same time as the opening operation of the seal member was started. The "Degree of opening of the seal member" row shows the effective cross-sectional area of the flow channel which communicates between the supply channel and the blow nozzle produced by opening the seal member as a percentage (%) with respect to when this flow channel is completely open. "0" shows that this flow channel is completely closed, and "100" shows that it is completely open. Furthermore, the "Rise of pressure in the supply channel in the initial supply period" row is the pressure of the liquid supplied to the preform in the initial stage in which the supply of the pressurized liquid to the supply channel by the pressurized liquid supply has started. "Yes" shows that the pressure has exceeded a specific value (a value set by the pressurized liquid supply), and "no" shows a state in which it has not exceeded the specific value. Moreover, the "Misalignment" row shows the result of evaluating the presence or absence of misalignment in the container after the molding. Furthermore, for the property value of the container after the molding, the results of 3 measurements of the filling capacity of the container (the quantity of liquid that can be introduced into it) and their average value are shown.

From the results of Table 1, it can be confirmed that, in the case in which the operation timing of the pressurized liquid supply section was 0 (second), that is, in the case in which the supply of the pressurized liquid by the pressurized liquid supply to the supply channel was started at the same time as the opening of the seal member was started, a rise in the pressure of the liquid supplied to the preform in the initial stage of the supply was produced and a misalignment was produced in the container after the molding. As opposed to this, in the case in which the supply of the pressurized liquid by the pressurized liquid supply to the supply channel was started after the opening of the seal member was started, this rise in pressure was not produced, that is, a lowering of molding ability caused by a pressure rise was not produced, and the molding ability was raised.

In particular, in the case in which the operation timing of the pressurized liquid supply was made 0.01 (second) or longer after the operation of the seal member was started, a sufficient degree of opening of the seal member when the supply of the pressurized liquid by the pressurized liquid supply to the supply channel was started was assured, and a high molding ability could be assured. Moreover, even in the case in which water at an ordinary temperature (20° C.) was used as the pressurized water, as in this test, it was confirmed that a high molding ability can be expected, without producing a misalignment, if the operation timing of the pressurized water supply part is made no longer than 0.05 (second) after the opening of the seal member is started. From these results, it could be confirmed that it is preferable if the operation timing of the pressurized water supply part is made no less than 0.01 (second) and no more than 0.05 (second) after the opening of the seal member is started.

Furthermore, in the case in which the operation timing of the pressurized water supply part is made 0.06 (second) after the opening of the seal member is started, no lowering of the molding ability due to the aforementioned rise in pressure is produced, but the quantity of the liquid that is not pressurized which flows into the preform before the preform is liquid-blow-molded is increased and the preform is cooled; as a result, its molding ability is lowered due to misalignment being caused, etc. In this case, the measurement of the filling capacity of the container was omitted, since a molding defect was produced.

Moreover, it can be seen from the evaluation results of Table 1 that, when the operation timing of the pressurized water supply part was made no less than 0.01 second and no more than 0.03 second from the start of the opening of the seal member, the filling capacity of the container after molding was increased, as compared with the case in which the operation timing of the pressurized water supply part was made 0 (second) after the opening of the seal member was started, that is, when the supply of the pressurized liquid to the supply channel by the pressurized liquid supply section was started at the same time as the opening of the seal member was started. From this fact, it could be confirmed that a better molding ability of the preform is obtained when the operation timing of the pressurized water supply part is made no less than 0.01 (second) and no more than 0.03 (second).

The scope of the present invention is not limited to the working embodiment described above; various modifications are of course possible within a range that does not depart from the gist of the invention.

Moreover, the seal member 20 is not limited to the constitution described above. Various constitutions may be employed, as long as the supply channel 17 which is provided as the supply channel 17 can be opened and closed with respect to the blow nozzle 15.

Furthermore, the liquid blow molding apparatus 1 can also be made in a constitution which does not include the extension rod 22.

The invention claimed is:

1. A liquid blow molding method for forming a resin preform into a container having a prescribed shape, the liquid blow molding method comprising the steps of:
    disposing a preform in a blow molding mold, the preform having an open end with a tubular body extending therefrom to a closed end,
    fitting a blow nozzle into the open end of the preform,
    supplying a pressurized liquid to a supply channel connected to the blow nozzle at a first pressure, and
    at a first point of time during the blow molding method, moving a seal member in the supply channel from a closed position to an open position establishing an open condition of the supply channel with respect to the blow nozzle; and,
    at a second point in time during the blow molding method, the second point in time being after the first point in time, and after initiating the moving of the seal member to the open position has started, starting injection of the pressurized liquid with the pressurized liquid at the first pressure and increasing the pressure of the pressurized liquid supplied to the supply channel from the first pressure to a forming pressure for forming the preform into the container.

2. The liquid blow molding method according to claim 1, wherein the time from the starting of the moving of the seal member until the increasing of the pressure of the pressurized liquid supplied to the supply channel is in the range of 0.01 to 0.05 seconds.

3. The liquid blow molding method according to claim 1, wherein the time from the starting of the moving of the seal member until the increasing of the pressure of the pressurized liquid supplied to the supply channel is in the range of 0.01 to 0.03 seconds.

4. The liquid blow molding method according to claim 1, wherein the time from the starting of the moving of the seal member until the increasing of the pressure of the pressurized liquid supplied to the supply channel is greater than or equal to 0.01 seconds.

5. The liquid blow molding method according to claim 1, wherein the time from the starting of the moving of the seal member until the increasing of the pressure of the pressurized liquid supplied to the supply channel is less than or equal to 0.05 seconds.

6. The liquid blow molding method according to claim 1, wherein the time from the starting of the moving of the seal member until the increasing of the pressure of the pressurized liquid supplied to the supply channel is less than or equal to 0.03 seconds.

7. The liquid blow molding method according to claim 1, wherein the seal member is less than 10% open at a time 0.01 seconds after initiating moving of the seal member.

8. The liquid blow molding method according to claim 1, wherein the seal member is greater than 50% open at a time 0.02 seconds after initiating moving of the seal member.

9. The liquid blow molding method according to claim 1, wherein the seal member is 100% open at a time 0.05 seconds after initiating moving of the seal member.

10. The liquid blow molding method according to claim 1, wherein the seal member is 100% open at a time 0.03 seconds after initiating moving of the seal member.

11. The liquid blow molding method according to claim 1, wherein the increasing of the pressure of the pressurized liquid supplied to the supply channel begins after the seal member is greater than or equal to 9% open.

12. The liquid blow molding method according to claim 1, wherein the increasing of the pressure of the pressurized liquid supplied to the supply channel begins after the seal member is greater than or equal to 50% open.

13. The liquid blow molding method according to claim 1, wherein the increasing of the pressure of the pressurized liquid supplied to the supply channel begins after the seal member is 100% open.

* * * * *